Patented Nov. 27, 1951

2,576,106

UNITED STATES PATENT OFFICE 2,576,106

N-DICYCLOHEXYL, DIALKYLAMINO-ALKANAMIDES

John W. Cusic, Skokie, Ill., assignor to G. D. Searle & Co., Chicago, Ill., a corporation of Illinois No Drawing. Application July 13, 1948,
Serial No. 38,557

4 Claims. (Cl. 260—561)

This invention relates to N-substituted basic alkanoamides, to salts thereof, and to methods for producing such amides and salts. More particularly, this invention relates to aminoalkanoamides of the following general structural formula

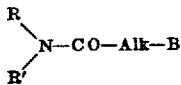

wherein R and R' are aryl, aralkyl, cycloalkyl, cycloalkylalkyl, or aromatic heterocyclic radicals, Alk is a lower alkylene radical having at least 2 carbon atoms between the carbonyl and amino groups, and B is an organic aliphatic or aliphatic-type amino radical.

In the foregoing structural formula, R and R' represent the same or different radicals selected from aryl, aralkyl, cycloalkyl, cycloalkylalkyl and heterocyclic aromatic series. They therefore may represent aryl radicals such as phenyl, tolyl, anisyl, phenetyl, naphthyl, anthryl, bromophenyl, chlorophenyl, xylyl, xenyl, and related aromatic radicals. R and R' may also represent aralkyl radicals such as benzyl, phenethyl, naphthylmethyl, methoxybenzyl, chlorobenzyl, bromobenzyl, veratryl, and the like. R and R' may represent cycloalkyl and cycloalkylalkyl radicals such as cyclohexyl, cyclopentyl, cyclobutyl, cyclohexylmethyl, β-cyclohexylethyl, cyclopentylmethyl, and other alicyclic hydrocarbon radicals. R and R' also stand for heterocyclic radicals which are aromatic in character, including pyridyl, thianyl, thiazolyl, pyrazinyl, pyrimidyl and related radicals. One substituent of R and R' may represent an alkyl or hydroxyalkyl radical while the other group represents an aryl, aralkyl, cyloalkyl, cycloalkylalkyl or aromatic heterocyclic radical of the type described hereinabove. Preferred are the alkyl radicals containing one to five carbon atoms and the mono- and dihydroxy derivatives thereof. The substituents R and R' may represent a single condensed ring system containing the nitrogen atmo, and comprising radicals such as the 10-phenothiazyl, 10-acridyl, 9 - carbazolyl, 9 - tetrahydrocarbazolyl, and 10-phenoxazinyl radicals. At least one of the radicals R and R' is a cyclic organic radical, that is, an aryl, cycloalkyl, aralkyl, cycloalkylalkyl or aromatic heterocyclic radical. R and R' are devoid of reactive substituents such as carboxyl, amino, hydroxyl, aliphatic halogen, sulfhydryl, sulfo and related acidic and basic groups.

The alkylene radical Alk is a bivalent hydrocarbon radical containing from 2 to 10 carbon atoms and having at least 2 carbon atoms (preferably 2 to 4) in the chain between the CO and B groupings, and represents alkylene radicals such as ethylene, propylene, butylene and amylene radicals, as well as polymethylene radicals such as trimethylene, tetramethylene, and related radicals. As used herein, lower alkylene refers to alkylene radicals containing from 2 to 10 carbon atoms.

The amino radical B represents secondary or tertiary aliphatic and aliphatic-type organic amino radicals such as mono- and dialkylamino radicals, alkanolamino and aralkylamino radicals and aliphatic-type cyclic amino radicals such as piperidino, morpholino, pyrrolidino, thiamorpholino, lupetidino, piperazino, and related amino radicals. Preferred are the lower dialkylamino radicals, viz., amino radicals bearing two alkyl substituents, the latter containing from one to five carbon atoms. When B represents a dialkylamino radical, the alkyl groups may be the same or different lower groups containing one to five carbon atoms, such as dimethylamino, diethylamino, dipropylamino, diamylamino, ethylmethylamino, propylmethylamino, butylmethylamino, butylethylamino, and similar dialkylamino radicals. Similarly, B can represent alkanolamino radicals such as ethanolamino, isopropanolamino, methylethanolamino, diethanolamino, methylisopropanolamino, ethylethanolamino, and related radicals. The radical B represents a non-aromatic amino radical derived from an atertiary organic amine (that is, a primary or secondary organic amine) which is aliphatic in nature and which has a basic dissociation constant in the range of $10^{-3}$ to $10^{-6}$.

Salts of the compounds which comprise this invention may be prepared by interaction with organic and inorganic acids such as hydrochloric, hydrobromic, hydriodic, sulfuric, phosphoric, citric, tartaric, acetic, benzoic, cinnamic, mandelic, maleic, malic, ascorbic, sulfamic, and similar acids which are non-toxic in therapeutic dosages. Acidic xanthines such as the 8-haloxanthines may also be used in the formation of salts. Among such xanthines are 8-chlorotheophylline, 8 - bromotheophylline and 8 - chlorotheobromine. Quaternary ammonium salts may be prepared of the compounds of this invention by treatment of the tertiary amino bases with a reactive ester of a strong acid. Among such esters of strong acids are methyl iodide, ethyl iodide, ethyl bromide, methyl chloride, methyl bromide, propyl bromide, benzyl chloride, benzyl bromide, phenethyl bromide, ethylene bromohydrin, propylene bromohydrin, dimethyl sulfate, diethyl sulfate, methyl p-toluenesulfonate, ethyl benzenesulfonate, and related esters. In general, the salts are soluble in water and constitute a preferred form of the invention. The organic bases are generally water-insoluble, but soluble in simple organic solvents such as alcohols, ethers, hydrocarbons, and lower ketones.

The compounds which comprise this invention are useful as pharmaceutical substances, having worth-while antispasmodic, antihistaminic, and diuretic activity. Certain of these substances are of value as surface-active agents and as antiseptics. They are furthermore of value as intermediates in the preparation of more complex organic substances for use in the preparation of pharmaceuticals and related materials. It is the object of this invention to provide materials which are useful for the foregoing purposes, as well as to provide efficient methods for their preparation.

My invention is further illustrated by the following substances, which are typical of those within its scope.

A. N,N-diphenethyl-γ-piperidinobutyramide

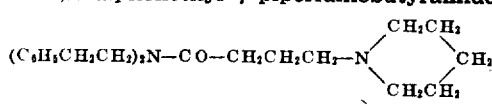

B. N - phenethyl - N - (β - cyclohexylethyl) - β-morpholinoisobutyramide.

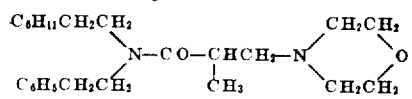

C. N - anisyl - N - (β - cyclopentylethyl) - β - methylethylaminopropionamide

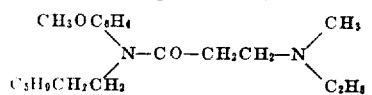

D. N - benzyl - N - cyclohexyl - γ - pyrrolidinobutyramide

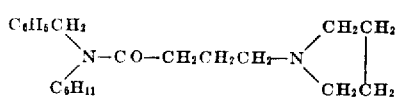

E. N - cyclohexyl - N - cylohexylmethyl - β - dipropylaminopropionamide

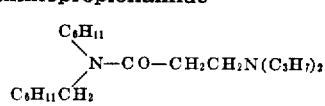

F. N - benzyl - N - α - naphthyl - β - diethanolaminobutyramide

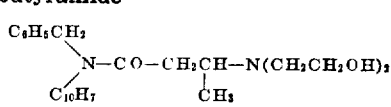

G. N - α -pyridyl - N - benzyl - β - dipropylaminopropionamide

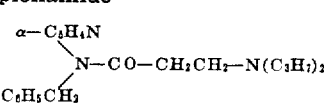

H. N - phenyl - N -α - naphthyl - β - dimethylaminobutyramide

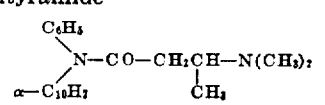

I. N - β - naphthyl - N - n - butyl - β - dimethylaminopropionamide

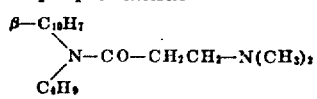

J. N - α - pyridyl - N - phenyl - β - dibutylaminopropionamide

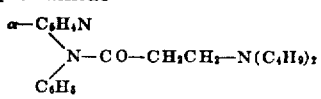

K. N - phenyl - N - cyclohexyl - β - diethylaminopivalamide

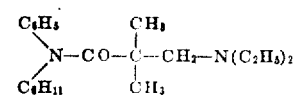

L. N - phenethyl - N - p - xenyl - β - methylethanolaminovaleramide

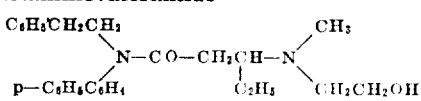

M. N - phenyl - N - α - pyridyl - γ - dimethylaminobutyramide

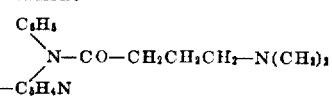

N. N - benzyl - N - α - thienyl - β - morpholinopropionamide

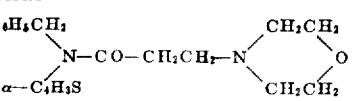

O. N,N - dicyclohexyl - δ - dimethylaminovaleramide

The compounds which make up this invention can be prepared by reacting an atertiary (i. e., primary or secondary) amine of the formula

wherein R and R' have the meanings given hereinabove, with an acid halide or an acid anhydride derived from a haloalkanoic acid of the formula X—Alk—COOH, wherein X represents a halogen, preferably a middle halogen such as bromine or chlorine, and subsequently reacting the haloalkanoamide thus formed, which has the formula X—Alk—CO—NRR', with a primary or secondary aliphatic or aliphatic-type organic amine of the formula BH, wherein B has the meaning given hereinabove. The reaction of the secondary amine with the haloalkanoyl halide or anhydride is preferably carried out in an inert solvent such as dry benzene or toluene or dioxane, or an acid-binding solvent such as pyridine, dimethylaniline, quinoline, and the like. An excess of secondary amine is preferred if the reaction is carried out in a neutral medium. Generally at least 2 moles of secondary amine are desired, in order that there be sufficient excess amine to bind the acid liberated during the reaction. The haloalkanoamide is soluble in the organic reaction medium, and may be separated from undesired salts by filtration and evaporation. In many cases the haloalkanoamide is a crystalline substance, but it is generally unnecessary to isolate this substance in a state of purity. It can generally be reacted with the aliphatic amine in the next step in the condition in which it is obtained from the reaction mixture. In the reaction of the haloalkanoamide with the aliphatic-type amine, again it is desirable to use an excess of the aliphatic-type amine, preferably at least 2 moles of amine to 1 mole of the haloalkanoamide. The reaction is preferably carried out in an aliphatic ketone such as acetone, methyl ethyl ketone, diethyl ketone or the like. It is often advantageous to add a small amount of potassium iodide to catalyze the reaction of the haloalkanoamide. This reaction is preferably carried out at room temperature or slightly elevated temperatures, in the range of 25 to 100° centigrade. In certain instances the reaction is very rapid at room temperature, being complete within a few minutes. In other instances, heating at nearly 100° for a period of a few days may be required.

The aminoalkanoamides which result from the reaction are generally isolated by distillation under high vacuum. However, this step is not essential, and in many instances the basic amides may be obtained in crystalline form from the reaction mixture, where they may be separated with their acid addition salt, with a suitable organic acid of the type discussed hereinabove.

My invention is disclosed in greater detail in the following examples, which are provided for the purpose of illustrating the invention and which are in no way to be construed as defining or limiting the invention in spirit or in scope. Relative amounts of materials are given in parts by weight.

*Example 1*

A. To a solution of 394 parts of dibenzylamine in about 530 parts of anhydrous ether are added with good agitation 127 parts of β-chloropropionyl chloride in 530 parts of anhydrous ether at 0° C. After 1 hour, a large amount of benzene is added to aid the filtration, and the white precipitate of dibenzylamine hydrochloride is removed by filtration. The filtrate is evaporated in vacuo and the residue of N,N-dibenzyl-β-chloropropionamide is used in the next step.

B. 303 parts of N,N-dibenzyl-β-chloropropionamide and 200 parts of diethylamine in 800 parts of methyl ethyl ketone containing 10 parts of potassium iodide are heated at about 60° C. for 30-50 hours in a closed vessel. The reaction mixture is taken up in dilute mineral acid and extracted with ether. The acid solution is then made alkaline and extracted with ether. The latter ether extract is dried and evaporated. The residue of N,N-dibenzyl-β-diethylaminopropionamide is distilled under reduced pressure, and boils at 208-210° C. at 1.5 millimeters pressure. This product has the formula (C₆H₅CH₂)₂N—CO—CH₂CH₂N(C₂H₅)₂

A solution of this base in dry ether is treated with absolute alcoholic hydrogen chloride and forms the corresponding hydrochloride, which melts at 144-145° C.

*Example 2*

607 parts of N,N-dibenzyl-β-chloropropionamide, 250 parts of dimethylamine, and 800 parts of methyl ethyl ketone containing 10 parts of potassium iodide are reacted as in Example 1. N,N-dibenzyl-β-dimethylaminopropionamide is isolated as above and distils at 204-208° C. at 2 mm. pressure. This compound has the formula (C₆H₅CH₂)₂N—CO—CH₂CH₂N(CH₃)₂

The hydrochloride prepared by the method of Example 1 melts at 142-144° C.

*Example 3*

20 parts of N,N-dibenzyl-β-dimethylaminopropionamide and 6 parts of methyl chloride in 80 parts of methyl ethyl ketone are mixed and allowed to stand at room temperature in a closed vessel. In about 2 hours, the reaction mixture is a solid mass of crystals. These are broken up under methyl ethyl ketone, filtered, washed with ether, and dried. The crystalline N,N-dibenzyl-β-dimethylaminopropionamide methochloride melts at 153-154° C.

(C₆H₅CH₂)₂N—CO—CH₂CH₂N(CH₃)₃·Cl

*Example 4*

A solution of 183 parts of benzylaniline in about 300 parts of dry ether is cooled in ice. To this solution is added dropwise with good stirring a solution of 63.5 parts of β-chloropropionyl chloride in 300 parts of dry ether. The mixture is stirred for 1½ hours after the addition is complete, and the precipitate of benzylaniline hydrochloride is collected on a filter. The filtrate is washed with dilute mineral acid and with water, dried and stripped of solvent. The residue of N-benzyl-N-phenyl-β-chloropropionamide is of sufficient purity for use in the next step.

547 parts of N-benzyl-N-phenyl-β-chloropropionamide, 220 parts of dimethylamine, 10 parts of potassium iodide, and 800 parts of methyl ethyl ketone are thoroughly mixed in a closed reactor and kept at 60-70° C. for 15 hours. The reaction mixture is taken up in an excess of dilute hydrochloric acid and extracted with ether. The acid phase is made alkaline and extracted with ether. The second ether extract is dried and evaporated. The residue of N-benzyl-N-phenyl-β-dimethylaminopropionamide is distilled at 183-188° C. at 2 mm. pressure. The compound has the formula $$C_6H_5CH_2-N-CO-CH_2CH_2N(CH_3)_2$$
$$|$$
$$C_6H_5$$

The hydrochloride is made from an ether solution of the base by treatment with alcoholic hydrogen chloride. After recrystallization from isopropanol, this salt melts at 180-181° C.

The l-ascorbic acid salt of N-benzyl-N-phenyl-β-dimethylaminopropionamide is prepared by treating 12 parts of the basic amide with 7 parts of l-ascorbic acid in 80 parts of hot isopropanol. On chilling, the crystalline salt precipitates. This is removed by decantation and dried in vacuo, first at room temperature, and then for 2 hours at 65° C. It is readily soluble in water. It is conveniently used as a 10% aqueous solution.

*Example 5*

A solution of 19 parts of N-benzyl-N-phenyl-β-dimethylaminopropionamide in 80 parts of methyl ethyl ketone is treated with a slow stream of gaseous methyl chloride at ice temperature. During the addition of methyl chloride, a heavy precipitate forms. After 6 parts of methyl chloride are absorbed, the reaction mixture is allowed to stand at room temperature for several hours. The crystalline precipitate of N-benzyl-N-phenyl-β-trimethylaminopropionamide chloride is removed by filtration, washed and dried. It melts at about 204-205° C. It has the formula $$C_6H_5CH_2-N-CO-CH_2CH_2-N(CH_3)_3·Cl$$
$$|$$
$$C_6H_5$$

Example 6

A suspension of 101.5 parts of diphenylamine and 73 parts of β-chloropropionyl chloride in 600 parts of dry benzene is refluxed overnight, filtered with decolorizing charcoal, and the filtrate is evaporated under reduced pressure. A heavy oil of N,N-diphenyl-β-chloropropionamide soon crystallizes. It is recrystallized from alcohol and melts at 93-94° C.

43 parts of N,N-diphenyl-β-chloropropionamide, 30 parts of diethylamine, 1 part of potassium iodide, and 80 parts of methyl ethyl ketone are heated together in a closed vessel for several hours. Then the solvent is removed under reduced pressure and the residue of N,N-diphenyl-β-diethylaminopropionamide is distilled at 192-194° C. at 1.5 mm. pressure. The basic amide has the formula $(C_6H_5)_2N-CO-CH_2CH_2N(C_2H_5)_2$ The corresponding hydrochloride is prepared by the method of Example 1. After recrystallization from methyl ethyl ketone, it melts at 135-136° C.

Example 7

A solution of 259 parts of N,N-diphenyl-β-chloropropionamide, 120 parts of dimethylamine, 10 parts of potassium iodide and 400 parts of methyl ethyl ketone is heated for about 15 hours at about 60° C. in a closed vessel. The chilled reaction mixture is dissolved in dilute hydrochloric acid and extracted with ether. The acid solution is made alkaline and extracted with ether. The second ether extract is dried and evaporated. The residue of N,N-diphenyl-β-dimethylaminopropionamide is distilled at 182-186° C. at 2 mm. pressure. This compound has the formula $(C_6H_5)_2N-CO-CH_2CH_2N(CH_3)_2$ The hydrochloride is prepared by treating an ether solution of the basic amide with a slight excess of dry alcoholic hydrogen chloride. It precipitates as an oil which is removed by decantation, taken up in isopropanol, and precipitated with ether. On chilling, the precipitate crystallizes and is separated by decantation. This is triturated with hot ethyl acetate, filtered and dried. After recrystallization from a mixture of ethyl acetate and isopropanol, the hydrochloride melts at 169-170° C.

Example 8

10 parts of N,N-diphenyl-β-dimethylaminopropionamide and 5 parts of methyl chloride in 40 parts of methyl ethyl ketone are thoroughly mixed and left at room temperature for several hours. The crystalline precipitate of N,N-diphenyl-β-trimethylaminopropionamide chloride crystallizes. This is collected on a filter, washed and dried, and melts at 198-199° C.

$(C_6H_5)_2N-CO-CH_2CH_2N(CH_3)_3 \cdot Cl$

Example 9

362 parts of dicyclohexylamine in about 750 parts of dry ether at 0° C. are treated with a solution of 127 parts of β-chloropropionyl chloride in 750 parts of dry ether. The mixture is filtered to remove dicyclohexylamine hydrochloride, and the filtrate is stripped of solvent under reduced pressure. The semi-crystalline residue of N,N - dicyclohexyl-β-chloropropionamide is used as such in the next step.

554 parts of N,N-dicyclohexyl-β-chloropropionamide, 250 parts of dimethylamine, 10 parts of potassium iodide, and 800 parts of methyl ethyl ketone are thoroughly mixed and heated at about 60-65° C. for 3 days in a pressure vessel. The reaction mixture is taken up in dilute hydrochloric acid and extracted with ether. A heavy precipitate occurs during the extraction with ether. This precipitate is removed by filtration and dried. It is the hydrochloride of N,N - dicyclohexyl - β - dimethylaminopropionamide and melts at about 206-208° C.

The free base, N,N-dicyclohexyl-β-dimethylaminopropionamide, is obtained from the filtrate by treatment with alkali. It precipitates as a semi-solid which is removed by decantation and collected on a filter. It has the formula $(C_6H_{11})_2N-CO-CH_2CH_2N(CH_3)_2$

Example 10

10 parts of N,N-dicyclohexyl - β - dimethylaminopropionamide (Example 9) and 6 parts of methyl chloride in 60 parts of methyl ethyl ketone are thoroughly mixed and allowed to stand at room temperature overnight. The reaction mixture sets to a solid, which is ground under methyl ethyl ketone, filtered, washed with ether, and dried. N,N-dicyclohexyl-β-trimethylaminopropionamide chloride so obtained melts at about 214-215° C. It has the formula $(C_6H_{11})_2N-CO-CH_2CH_2N(CH_3)_3 \cdot Cl$

Example 11

71 parts of N,N-dicyclohexyl-β-chloropropionamide, 50 parts of diethylamine, 1 part of potassium iodide, and 80 parts of methyl ethyl ketone are reacted at 60° C. for 1 week in a pressure vessel. N,N-dicyclohexyl - β - diethylaminopropionamide is isolated by the method of Example 7, and distills at 182-184° C. at 1.5 mm. pressure. The basic amide has the formula $(C_6H_{11})_2N-CO-CH_2CH_2N(C_2H_5)_2$ It forms a crystalline hydrochloride by treatment of an ether solution of the basic amide with alcoholic hydrogen chloride, M. P. 176-177° C.

Example 12

80 parts of N - benzyl - N - phenyl - β - chloropropionamide, 60 parts of diethylamine, 1 part of potassium iodide, and 120 parts of methyl ethyl ketone are thoroughly mixed and heated at 60° C. for 3 days in a pressure vessel. N-benzyl-N-phenyl-β-diethylaminopropionamide is isolated according to the method of Example 7. It distils at 190-191° C. at 1.5 mm. pressure. It has the formula $$C_6H_5CH_2-\underset{\underset{C_6H_5}{|}}{N}-CO-CH_2CH_2N(C_2H_5)_2$$

Treatment of an ether solution of the basic amide with absolute alcoholic hydrogen chloride gives an oily precipitate of the hydrochloride. It forms a crystalline citrate containing 5.58% nitrogen (calculated 5.58%).

Example 13

15 parts of N,N-dicyclohexyl-β-diethylaminopropionamide in 60 parts of methyl ethyl ketone containing 10 parts of methyl chloride are kept at room temperature for about 15 hours. At the end of that time, the crystalline precipitate of the corresponding crystalline methochloride is collected on a filter, washed and dried. This salt melts at 218-219° C. with decomposition.

Example 14

A. A solution of 253 parts of benzyl chloride and 484 parts of phenethylamine in 1300 parts of toluene is refluxed for several days. A precipitate forms soon after the heating begins. At the end of about 5 days, this is removed by filtration, and the filtrate is evaporated under reduced pressure. The residue of benzyl-phenethylamine is distilled under reduced pressure and boils at about 143–153° C. at 2 mm. pressure.

B. 211 parts of benzylphenethylamine are treated in 1050 parts of dry ether with 62 parts of β-chloropropionyl chloride. The reaction is carried out at ice temperature with good agitation. The amine hydrochloride is removed by filtration, and the N-benzyl-N-phenethyl-β-chloropropionamide is isolated by evaporation of the ether filtrate.

C. 65 parts of N - benzyl - N - phenethyl - β - chloropropionamide and 25 parts of dimethylamine in about 100 parts of methyl ethyl ketone containing 1 gram of potassium iodide are heated at about 60–70° C. for 15 hours in a closed vessel. The precipitate of dimethylamine hydrochloride is removed, and the resulting solution is stripped of solvent under vacuum. The residue of N-benzyl - N - phenethyl - β - dimethylaminopropionamide is distilled under reduced pressure at 205–208° C. at 1.5 mm. pressure. It has the following structural formula

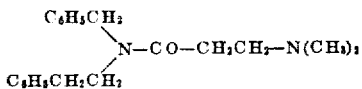

It forms a crystalline hydrochloride melting at 146–147° C.

Example 15

By the method of Example 14, using 40 parts of diethylamine in place of the dimethylamine, there is produced N-benzyl-N-phenethyl-β-diethylaminopropionamide, which distils at 216–218° C. at 1.5 mm. pressure. This has the formula

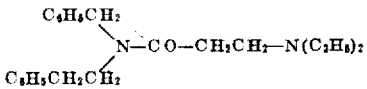

It forms a crystalline hydrochloride, M. P. 119–120° C.

Example 16

A. To 106 parts of N-cyclohexylaniline in about 1000 parts of dry ether at 0° C. is added a dry ethereal solution of 38 parts of β-chloropropionamide with good agitation. The precipitate of amine hydrochloride is removed by filtration and the N-cyclohexyl-N-phenyl-β-chloropropionamide is obtained by evaporation of the filtrate. After crystallization from alcohol, this compound melts at 77–78° C.

B. 25 parts of N-cyclohexyl-N-phenyl-β-chloropropionamide and 15 parts of dimethylamine in 80 parts of methyl ethyl ketone containing 1 part of potassium iodide are reacted as in Example 1B. The N-cyclohexyl-N-phenyl-β-dimethylaminopropionamide so obtained distils at 174–175° C. at 1.5 mm. pressure. It has the structural formula

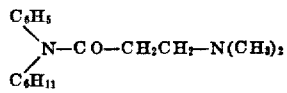

It forms a crystalline hydrochloride which melts at 151–153° C.

Example 17

Using the procedure of Example 16, but using 20 parts of diethylamine, there is produced N-cyclohexyl - N - phenyl-β-diethylaminopropionamide, which distils at 184–186° C. at 1.5 mm. pressure, and forms a crystalline hydrochloride melting at 140–141° C. It has the formula

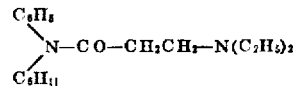

Example 18

A. 210 parts of diphenethylamine are reacted in 1000 parts of dry ether with 60 parts of β-chloropropionyl chloride according to the general method of Example 1A. There is thus produced as a viscous oil N,N-diphenethyl-β-chloropropionamide.

B. 74 parts of the foregoing chloroamine and 35 parts of dimethylamine in 180 parts of methyl ethyl ketone containing 1 gram of potassium iodide are heated under pressure at 60–70° C. for about 15 hours. After separation of the precipitate of amine hydrochloride, there is obtained from the solution N,N-diphenethyl-β-dimethylaminopropionamide, which distils at 216–218° C. and which has the formula

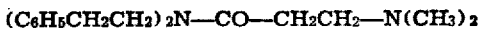

$(C_6H_5CH_2CH_2)_2N-CO-CH_2CH_2-N(CH_3)_2$

The hydrochloride of this base is hygroscopic, and consequently an accurate melting point could not be obtained. Analysis of a sample showed 9.80% chlorine (calculated, 9.83%).

Example 19

20 parts of N-benzyl-N-phenethyl-β-dimethylaminopropionamide in 80 parts of methyl ethyl ketone are treated with a slow stream of methyl chloride until 11 parts are absorbed. The resulting solution is heated in a closed vessel for half an hour at 60° C. and then allowed to stand at room temperature. The crystalline precipitate of the methochloride is removed by filtration, washed with methyl ethyl ketone, dried, and melts at 144–147° C.

Example 20

A. 90.5 parts of acridan in 1300 parts of dry toluene are agitated and refluxed while a solution of 63.5 parts of β-chloropropionyl chloride in 175 parts of dry toluene are added slowly. After the addition, the mixture is heated at 80–90° C. for about 15 hours. The reaction mixture is chilled and filtered, using a filter aid. The filtrate is further chilled and the precipitate so obtained is removed and discarded. The final solution is evaporated, and there is thus obtained an oily residue of 10-β-chloropropionylacridan.

B. 53 parts of 10-β-chloropropionylacridan, 25 parts of dimethylamine, and 1 part of potassium iodide in 120 parts of methyl ethyl ketone are heated at 60° C. in a closed vessel for 2 days. The reaction mixture is diluted with ether and extracted with dilute hydrochloric acid. There is formed a precipitate of 10-β-dimethylaminopropionylacridan hydrochloride. This is collected on a filter, washed and dried. It has the formula

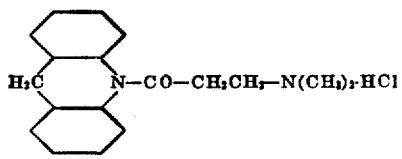

Example 21

The reaction is carried out according to the method of Example 20-B, using 40 parts of diethylamine in place of the dimethylamine. The reaction mixture is diluted with ether and extracted with dilute hydrochloric acid. The aqueous acid layer is made alkaline and extracted with ether. The ether solution is dried and evaporated. The residue of 10-β-diethylaminopropionylacridan is taken up in dry ether, treated with decolorizing charcoal, cooled and reacted with anhydrous alcoholic hydrogen chloride. The crystalline precipitate of the hydrochloride is collected on a filter, washed and dried. It melts at 185–186° C. It has the formula

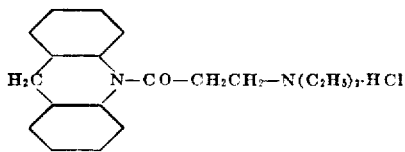

Example 22

20 parts of N-benzyl-N-phenyl-β-diethylaminopropionamide and 9 parts of methyl chloride in 80 parts of methyl ethyl ketone are heated for 3 hours in a closed vessel at 60° C. The reaction mixture is chilled and diluted with dry ether. There is thus obtained a precipitate of the crystalline methochloride, which is hygroscopic. A sample of this salt on analysis showed 9.75% chlorine (calculated 9.83%).

Example 23

15 parts of N-benzyl-N-phenethyl-β-diethylaminopropionamide are reacted with 8 parts of methyl chloride in 60 parts of methyl ethyl ketone in a closed vessel at 60° C. for 1 hour. The crystalline methochloride is obtained by chilling the reaction mixture and filtering the precipitate so formed. After washing and drying, a sample of the quaternary salt showed on analysis 7.00% nitrogen (calculated 7.20%).

Example 24

The methochloride of N,N-phenethyl-β-diethylaminopropionamide is prepared by reacting 20 parts of the basic amide with 12 parts of methyl chloride in 80 parts of methyl ethyl ketone at 60° C. for 1 hour. The crystalline precipitate of the methochloride is collected on a filter, washed and dried, and melts at 135–136° C.

Example 25

74 parts of N,N-diphenethyl-β-chloropropionamide are reacted according to the method of Example 18 with 50 parts of diethylamine in 80 parts of methyl ethyl ketone containing 1 part of potassium iodide. There is obtained N,N-diphenethyl-β-diethylaminopropionamide as a nearly colorless oil distilling at 224–227° C. at 1.5 mm. pressure. This product forms a crystalline hydrochloride melting at 92–94° C. after crystallization from ethyl acetate. The basic amide has the formula $(C_6H_5CH_2CH_2)_2N-CO-CH_2CH_2-N(C_2H_5)_2$

Example 26

A solution of 20 parts of N,N-diphenethyl-β-dimethylaminopropionamide in 80 parts of methyl ethyl ketone containing 11 parts of methyl chloride is kept at room temperature for about 15 hours. The crystalline methochloride is removed by filtration, washed and dried. It melts at 168–169° C.

Example 27

A. A solution of 181.4 parts of dicyclohexylamine in 350 parts of dry ether at 0° C. is reacted with a solution of 71 parts of γ-chlorobutyryl chloride (boiling point 60–65° C. at 9 mm. pressure) in 350 parts of dry ether. The N,N-dicyclohexyl-γ-chlorobutyramide is isolated as in Example 9.

B. 71.5 parts of N,N-dicyclohexyl-γ-chlorobutyramide, 35 parts of dimethylamine and 1 part of potassium iodide in 120 parts of methyl ethyl ketone are heated in a closed vessel at 65–70° C. for about 3 days. The cooled mixture is then diluted with ether and extracted with dilute mineral acid. The acid extract is made alkaline and extracted with ether. The ether extract is dried with anhydrous potassium carbonate, filtered and stripped of solvent in vacuo. The residue of N,N-dicyclohexyl-γ-dimethylaminobutyramide is distilled at 186–190° C. at 1.5 mm. pressure. It has the following formula $(C_6H_{11})_2N-CO-CH_2CH_2CH_2-N(CH_3)_2$

Example 28

By a method similar to that of Example 27-B using 50 parts of diethylamine in place of the dimethylamine, there is produced N,N-dicyclohexyl-γ-diethylaminobutyramide which distils at about 198–202° C. at 1.5 mm. pressure. It has the following formula $(C_6H_{11})_2N-CO-CH_2CH_2CH_2-N(C_2H_5)_2$

Example 29

A. To a solution of 197 parts of dibenzylamine in 300 parts of dry ether at ice temperature are added with good agitation 71 parts of β-chlorobutyryl chloride in 250 parts of dry ether. The mixture is agitated for several hours, then diluted with benzene and filtered. The filtrate is stripped of solvent under vacuum and the residue of N,N-dibenzyl-β-chlorobutyramide is used in the next step.

B. 30 parts of N,N-dibenzyl-β-chlorobutyramide, 20 parts of dimethylamine and 1 part of potassium iodide in 80 parts of methyl ethyl ketone are heated in a closed reactor at 60–65° C. for 5 days. The chilled mixture is diluted with ether and extracted with dilute muriatic acid. The acid extract is alkalinized and extracted with ether. The ether solution is dried and evaporated. The resulting residue of N,N-dibenzyl-β-dimethylaminobutyramide has a boiling range of 212–215° C. at 2 mm. pressure. It has the formula

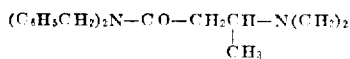

Example 30

90 parts of dicyclohexylamine are reacted with 39 parts of δ-chlorovaleryl chloride according to the procedure of Example 29. The N,N-dicyclohexyl-δ-chlorovaleramide is isolated by filtration and evaporation. It is reacted in a closed vessel for 5 days at 60–65° C. with 50 parts of diethylamine in 150 parts of methyl ethyl ketone containing 2 parts of potassium iodide. The mixture is partially evaporated under vacuum and then diluted with several volumes of ether. The suspension is washed with dilute acid. From the acid wash is isolated by alkalinization, extraction with ether and evaporation of the ethereal extract, N,N-dicyclohexyl-δ-diethylaminovaleramide. This product distills at 210–214° C. at 1 mm. and has the formula (C₆H₁₁)₂N—CO—CH₂CH₂CH₂CH₂—N(C₂H₅)₂

Example 31

A solution of 109.5 parts of phenyl-β-naphthylamine and 63.5 parts of β-chloropropionyl chloride in 800 parts of benzene is refluxed for about 15 hours. The hot reaction mixture is treated with decolorizing charcoal and filtered. The filtrate is stripped of solvent and the residue of N-phenyl-N-(β-naphthyl)-β-chloropropionamide is taken up in about 80 parts of alcohol. To this solution are added 100 parts of diethylamine in 160 parts of methyl ethyl ketone containing 2 parts of potassium iodide. The resulting solution is heated at 60–65° C. for 3 days. It is then chilled, diluted with ether and extracted with dilute hydrochloric acid. The acid solution is made alkaline and extracted with ether. The ether extract is dried and stripped of solvent. The residue of N-phenyl-N-(β-naphthyl)-β-diethylaminopropionamide is converted to the hydrochloride, which crystallizes from isopropanol and melts at 170–171° C. The basic amide has the formula

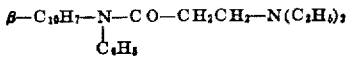

Example 32

N-phenyl-N-(α-naphthyl)-β-chloropropionamide is made by the method of Example 31. It crystallizes from alcohol; M. P. 113–114° C. A solution of 70 parts of N-phenyl-N-(α-naphthyl)-β-chloropropionamide, 50 parts of diethylamine and 1 part of potassium iodide in 80 parts of hot methyl ethyl ketone is kept at 60–65° C. for 3 days in a closed vessel. N-phenyl-N-(α-naphthyl)-β-diethylaminopropionamide is isolated as in Example 31. It forms a crystalline hydrochloride melting at 153–155° C. after crystallization from isopropanol diluted with ether. The basic amide has the formula

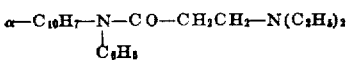

Example 33

A solution of 58 parts of 10-β-chloropropionylphenothiazine (application of John W. Cusic, Serial No. 22,505, filed April 21, 1948), 37.5 parts of methylethanolamine and 1 part of potassium iodide in 160 parts of methyl ethyl ketone is refluxed for 4 days. It is then diluted with benzene and extracted with dilute hydrochloric acid. The acid solution is made alkaline and a crystalline precipitate of 10-(β-methylethanolaminopropionyl)-phenothiazine forms. After recrystallization from alcohol it melts at 129–130° C. It has the formula

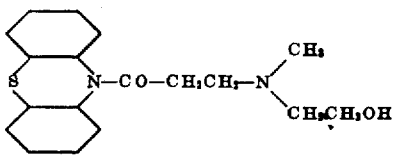

I claim:

1. A member of the group consisting of an N-substituted basic alkanoamide of the formula

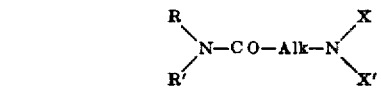

and salts thereof, wherein R and R' are cyclohexyl radicals, Alk is an alkylene radical containing at least two and not more than four carbon atoms, and X and X' are lower alkyl radicals containing not more than two carbon atoms, and wherein the salts are acid addition and lower alkyl halide quaternary ammonium salts.

2. An N,N-dicyclohexyl-β-dialkylaminopropionamide of the formula (C₆H₁₁)₂N—CO—CH₂CH₂—NRR' wherein R and R' are lower alkyl radicals containing not more than two carbon atoms.

3. N,N-dicyclohexyl-β-dimethylaminopropionamide.

4. N,N-dicyclohexyl-β-dimethylaminopropionamide hydrochloride.

JOHN W. CUSIC.

REFERENCES CITED

The following references are of record in the file of this patent:

UNITED STATES PATENTS

| Number | Name | Date |
|---|---|---|
| 2,139,190 | Iselin et al. | Dec. 6, 1938 |
| 2,153,707 | Becherer et al. | Apr. 11, 1939 |
| 2,256,186 | Balle et al. | Sept. 16, 1941 |
| 2,325,331 | Martin et al. | July 27, 1943 |
| 2,336,179 | Leuchs | Dec. 7, 1943 |
| 2,343,071 | Martin et al. | Feb. 29, 1944 |
| 2,441,498 | Lofgren et al. | May 11, 1948 |

FOREIGN PATENTS

| Number | Country | Date |
|---|---|---|
| 476,843 | Great Britain | Dec. 16, 1937 |

Certificate of Correction

Patent No. 2,576,106 — November 27, 1951

JOHN W. CUSIC

It is hereby certified that error appears in the printed specification of the above numbered patent requiring correction as follows:

Column 1, line 34, for "thianyl" read *thienyl*; line 38, for "cyloalkyl" read *cycloalkyl*; column 6, line 50, for "ascrobic" read *ascorbic*; column 10, line 20, for "chloroamine" read *chloroamide*; column 11, line 66, for that portion of the formula reading "$C_6H_5CH_2CH_2$)" read $(C_6H_5CH_2CH_2)$;

and that the said Letters Patent should be read as corrected above, so that the same may conform to the record of the case in the Patent Office.

Signed and sealed this 18th day of March, A. D. 1952.

[SEAL]

THOMAS F. MURPHY,
*Assistant Commissioner of Patents.*

Certificate of Correction

Patent No. 2,576,106 November 27, 1951

JOHN W. CUSIC

It is hereby certified that error appears in the printed specification of the above numbered patent requiring correction as follows:

Column 1, line 34, for "thianyl" read *thienyl*; line 38, for "cyloalkyl" read *cycloalkyl*; column 6, line 50, for "ascrobic" read *ascorbic*; column 10, line 20, for "chloroamine" read *chloroamide*; column 11, line 66, for that portion of the formula reading "$C_6H_5CH_2CH_2$)" read $(C_6H_5CH_2CH_2)$;

and that the said Letters Patent should be read as corrected above, so that the same may conform to the record of the case in the Patent Office.

Signed and sealed this 18th day of March, A. D. 1952.

[SEAL]

THOMAS F. MURPHY,
*Assistant Commissioner of Patents.*